United States Patent
Ee et al.

(10) Patent No.: US 9,892,748 B1
(45) Date of Patent: Feb. 13, 2018

(54) HEAD SUSPENSION ASSEMBLY HAVING PZT DAMPER WITH NON-UNIFORM THICKNESS

(71) Applicant: Magnecomp Corporation, Murrieta, CA (US)

(72) Inventors: Kuen Chee Ee, Chino, CA (US); Long Zhang, Murrieta, CA (US); Keith A. Vanderlee, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/376,619

(22) Filed: Dec. 12, 2016

Related U.S. Application Data

(60) Provisional application No. 62/272,384, filed on Dec. 29, 2015.

(51) Int. Cl.
*G11B 5/596* (2006.01)
*G11B 33/08* (2006.01)
*G11B 5/48* (2006.01)
*G11B 5/55* (2006.01)

(52) U.S. Cl.
CPC ............ *G11B 5/483* (2015.09); *G11B 5/4826* (2013.01); *G11B 5/4833* (2013.01); *G11B 5/5552* (2013.01); *G11B 5/596* (2013.01); *G11B 33/08* (2013.01)

(58) Field of Classification Search
None
See application file for complete search history.

(56) References Cited

U.S. PATENT DOCUMENTS

| | | | |
|---|---|---|---|
| 6,353,515 B1 | 5/2002 | Helm | |
| 8,456,780 B1 * | 6/2013 | Ruiz .................... | G11B 5/4873 360/294.4 |
| 8,675,314 B1 * | 3/2014 | Bjorstrom et al. .... | G11B 5/483 360/294.3 |
| 8,834,660 B1 * | 9/2014 | Scheele et al. ........ | G11B 5/483 156/234 |
| 2008/0094758 A1 * | 4/2008 | Liao et al. ........... | G11B 5/4873 360/294.4 |
| 2014/0063660 A1 * | 3/2014 | Bjorstrom et al. ... | G11B 5/4873 360/245.8 |
| 2014/0078621 A1 * | 3/2014 | Miller et al. .......... | G11B 5/483 360/244.2 |

(Continued)

OTHER PUBLICATIONS

Kristina M. Jeric, "An Experimental Evaluation of the Application of Smart Damping Materials for Reducing Structural Noise and Vibrations," Virginia Polytechnic Institute and State University Master's Thesis (1999), pp. 4-17.

*Primary Examiner* — Craig A. Renner
(74) *Attorney, Agent, or Firm* — Nixon Peabody LLP

(57) ABSTRACT

In a gimbal dual stage actuated (GSA) suspension for a disk drive, a viscoelastic damper is disposed between and adhered to the suspension's PZT microactuator and the flexure trace gimbal. The damper is dispensed in fluid form onto the trace gimbal during assembly of the suspension, the PZT is placed onto the damper, and the damper is then hardened leaving it adhered to both the PZT and the trace gimbal. The damper reduces peaks in the frequency response of the PZT actuation, thus allowing higher bandwidth of the servo control loop and increasing the effective read and write speeds for the suspension.

18 Claims, 8 Drawing Sheets

(56) References Cited

U.S. PATENT DOCUMENTS

| | | | |
|---|---|---|---|
| 2014/0085754 A1* | 3/2014 | Hanya et al. | G11B 5/483 360/244.5 |
| 2014/0085755 A1* | 3/2014 | Hanya et al. | G11B 5/483 360/244.5 |
| 2014/0098440 A1 | 10/2014 | Miller et al. | |
| 2015/0243309 A1* | 8/2015 | Kido et al. | G11B 5/483 360/245.9 |

* cited by examiner

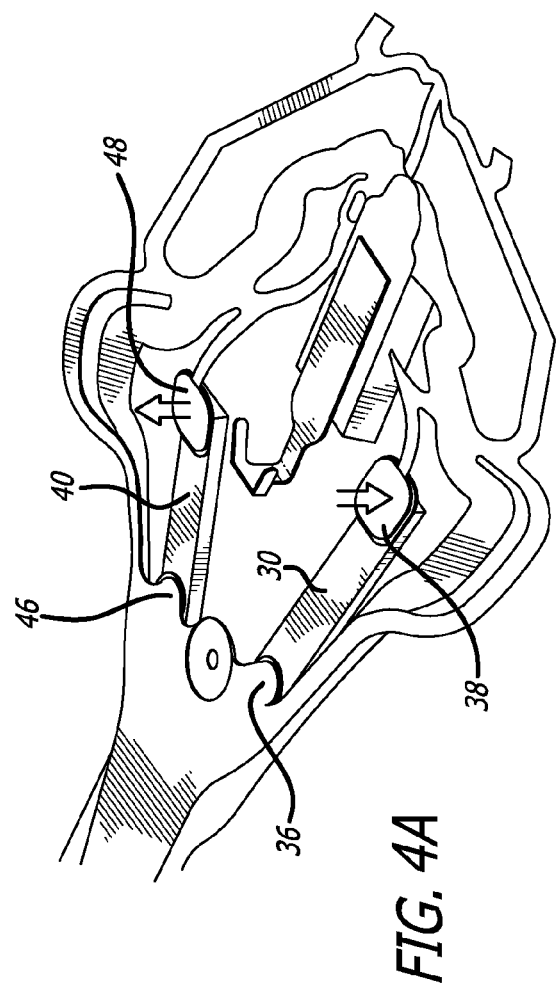
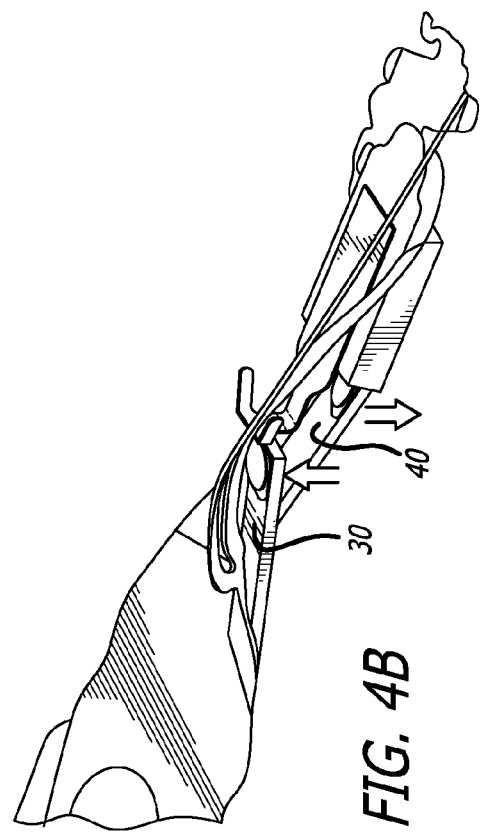
FIG. 4A
FIG. 4B

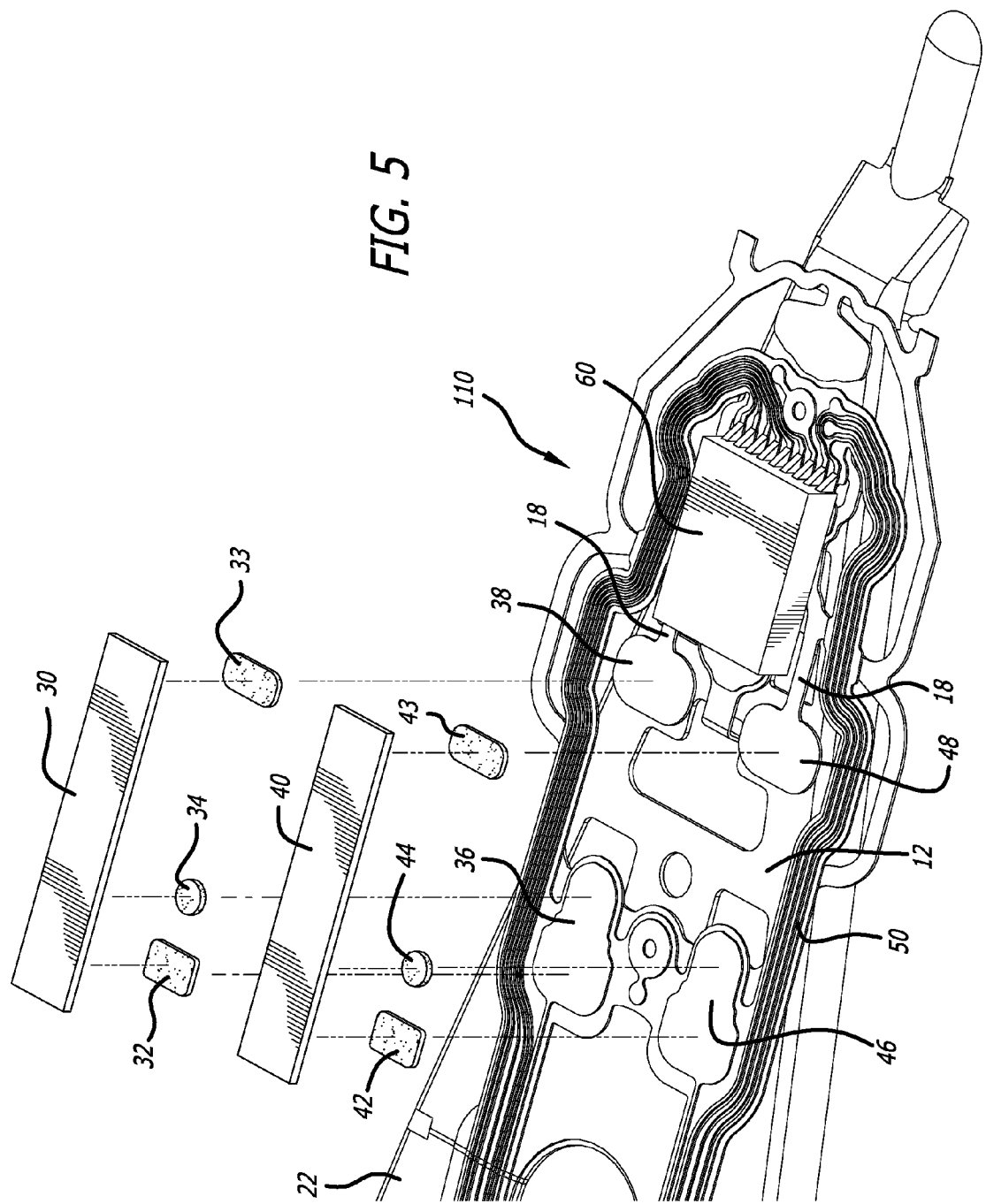

HEAD SUSPENSION ASSEMBLY HAVING PZT DAMPER WITH NON-UNIFORM THICKNESS

CROSS-REFERENCE TO RELATED APPLICATIONS

This application claims benefit of U.S. Provisional Patent Application No. 62/272,384 filed Dec. 29, 2015, the disclosure of which is incorporated by reference as if set forth fully herein.

BACKGROUND OF THE INVENTION

1. Field of the Invention

This invention relates to the field of head suspension assemblies for hard disk drives. More particularly, this invention relates to the field of a head suspension assembly for a hard disk drive, the head suspension having a PZT damper.

2. Description of Related Art

Magnetic hard disk drives and other types of spinning media drives such as optical disk drives are well known. A typical disk drive unit, for example, is shown in FIG. 1 of U.S. Pat. No. 8,879,210 issued to Hahn et al. ("the Hahn '210 patent") which is assigned to the present Applicant and which is incorporated by reference herein. The typical disk drive unit includes a spinning magnetic disk containing a pattern of magnetic storage medium ones and zeroes on it that constitutes the data stored on the disk drive. The magnetic disk is driven by a drive motor. The disk drive unit further includes a disk drive suspension to which a magnetic read/write is mounted proximate a distal end of load beam. The "proximal" end of a suspension or load beam is the end that is supported, i.e., the end nearest to the base plate which is swaged or otherwise mounted to an actuator arm. The "distal" end of a suspension or load beam is the end that is opposite the proximal end, i.e., the "distal" end is the cantilevered end.

The suspension is coupled to an actuator arm, which in turn is coupled to a voice coil motor that moves the suspension arcuately in order to position the head slider over the correct data track on the data disk. The head slider is carried on a gimbal which allows the slider to pitch and roll so that it follows the proper data track on the disk, allowing for such variations as vibrations of the disk, inertial events such as bumping, and irregularities in the disk's surface.

Dual stage actuated (DSA) suspensions have become common in recent years as data track widths have continued to decrease. In a DSA suspension a small actuator located on the suspension moves the head slider in order to position the head slider over the correct data track. The actuator provides both finer positioning of the head slider than does the voice coil motor, and provides faster servo bandwidth than does the voice coil motor. The actuator may be located in various places on the suspension depending on the particular DSA suspension design. Typically, left- and right-side actuators act in push-pull fashion to rotate the load beam or the distal end of the load beam. Some of the earliest DSA suspension designs placed the actuator on the baseplate, with actuation of the PZTs causing the entire load beam to rotate. Actuators used in DSA suspension have been called milliactuators or microactuators.

The actuators are often piezoelectric (PZT) devices, although static electric actuators and other types of very small actuators are known and have been used on DSA suspensions. For simplicity of discussion, actuators will be referred to herein generally as microactuators or simply PZTs, it being understood that the actuator need not necessarily be of the piezoelectric type.

FIGS. 3 and 4 of the Hahn '210 patent are representative of recent DSA designs which locate the PZT's on the flexure itself. Such a design places the PZTs much closer to the head slider, resulting in significantly higher servo bandwidth. Those figures show a load beam and a flexure 220 attached to the load beam. The PZTs are attached or anchored at their proximal ends to a relatively fixed part of the flexure, and at their distal ends to the flexure gimbal through a coupling such that as the PZTs are actuated they rotate the head slider to position it over the desired data track. Such a design in which the PZTs are mounted to the gimbal is sometimes referred to as a GSA suspension or design. A GSA suspension is one type of DSA suspension.

FIG. 1 herein is a bottom plan view of the distal area of a flexure 10, near the PZTs of a GSA suspension according to one prior art GSA suspension as disclosed in the Hahn '210 patent. The three main layers of flexure 10 are a metal layer 12 which is typically stainless steel, an insulating layer which is commonly polyimide, and a conductive layer which is typically copper or copper alloy and which carries electrical signals and voltages to and from head slider 60 and PZTs 30, 40. The electrical connections to PZTs 30, 40 are omitted for clarity of illustration. PZTs 30, 40 are anchored at their proximal ends to a relatively fixed portion 14 of the flexure, and are connected to a gimbaled portion, trace gimbal, or simply gimbal 16 via flexible connectors 18. When PZTs 30, 40 expand and contract longitudinally in push/pull fashion, they cause head slider 60 to rotate, thus providing fine positioning of the head slider over the desired data track on the disk platter below.

The term "z-height" or $h_z$ as used herein is defined as the distance from the baseplate flange to the data disk surface, as illustrated in stylized FIG. 2 herein. When the base plate 20 of the suspension is swaged to the e-block actuator arm in a disk drive, plastic deformation usually occurs which causes the z-height $h_z$ to deviate from its nominal value. The deviation from nominal z-height is usually significantly higher for disk drives having multiple platters due to the additional variation in stack-up tolerance.

As used herein the term PZT frequency response function (FRF) is the frequency response of the PZT, with the input being the PZT actuation voltage and the output being the off-track displacement of the trailing edge of the head slider 60 where the read/write transducer is typically located.

It has been found that the servo bandwidth of a GSA design is closely related to the low frequency peaks of the PZT FRF, especially below the sway frequency of the suspension which is approximately 22 kHz for the exemplary suspension. As a rule of thumb, a relatively flat, or "clean" PZT FRF having a low gain and a minimal sensitivity to z-height of the suspension baseplate above the disk platter surface, allows for higher servo bandwidth at the disk drive level. A higher servo bandwidth means faster seek times and faster read and write speeds. Z-height sensitivity is important because the PZT FRF is fine-tuned to the nominal z-height of the head gimbal assembly (HGA) such as by controlling the bend location in the suspension spring and the sag angle of the load beam. As discussed above, however, there can be significant deviation in the z-height in a particular suspension from the nominal value at drive level.

FIG. 3 is a PZT frequency response plot of a prior art GSA suspension for different z-heights, namely for z-heights of 0.38 mm, 0.48 mm, 0.58 mm, and 0.68 mm, according to a simulation.

In general, low gain and low z-height sensitivity especially at the lower frequency are desired design goals. In the figure, the local peaks at 6 kHz, 9 kHz, 16 kHz, and 17 kHz are undesirable. Typically, resonance tuning by spring bend location and SAG angle allows some control of the peaks at these frequency at nominal z-height, particularly the torsion mode at 6 kHz. Low frequency peaks have greater detrimental effect on the servo bandwidth. The local peaks at 16 kHz and 17 kHz are considered acceptable relative to 9 kHz as they are higher frequencies. The frequency of approximately 9 kHz where a large local peak occurs is the so-called PZT paddling mode, at which the PZTs are moving vertically as shown in the mechanical model simulation of FIGS. 4A and 4B which show the two PZTs vibrating in out-of-sync fashion, meaning that one PZT is flexing upward while the other PZT is flexing downward.

SUMMARY OF THE INVENTION

According to the invention, a viscoelastic damper is provided for the PZT, and in particular underneath the PZT between the PZT and the stainless steel surface of the flexure trace gimbal, in order to better control the local peaks and reduce z-height sensitivity of the PZT FRF. The viscoelastic damping material may be dispensed in fluid form such as a paste or sprayed onto the trace gimbal surface before the PZT is attached. The viscoelastic damping material is then sandwiched between the PZT and the trace gimbal, and then cured or hardened. The material remains viscoelastic after hardening.

The viscoelastic dampers help to attenuate vibrations of the PZT, particularly vertical vibrations of the PZTs at around the paddling frequency of 9 kHz. The result is faster read and write times.

BRIEF DESCRIPTION OF THE DRAWINGS

FIGS. 4A and 4B are oblique views of a flexure of a GSA suspension according to the prior art showing paddling mode vibration of the PZTs, according to a simulation.

FIG. 5 is a partially exploded oblique view of a suspension flexure according to an exemplary embodiment of the invention.

DETAILED DESCRIPTION OF THE PREFERRED EMBODIMENTS

Figure 1:
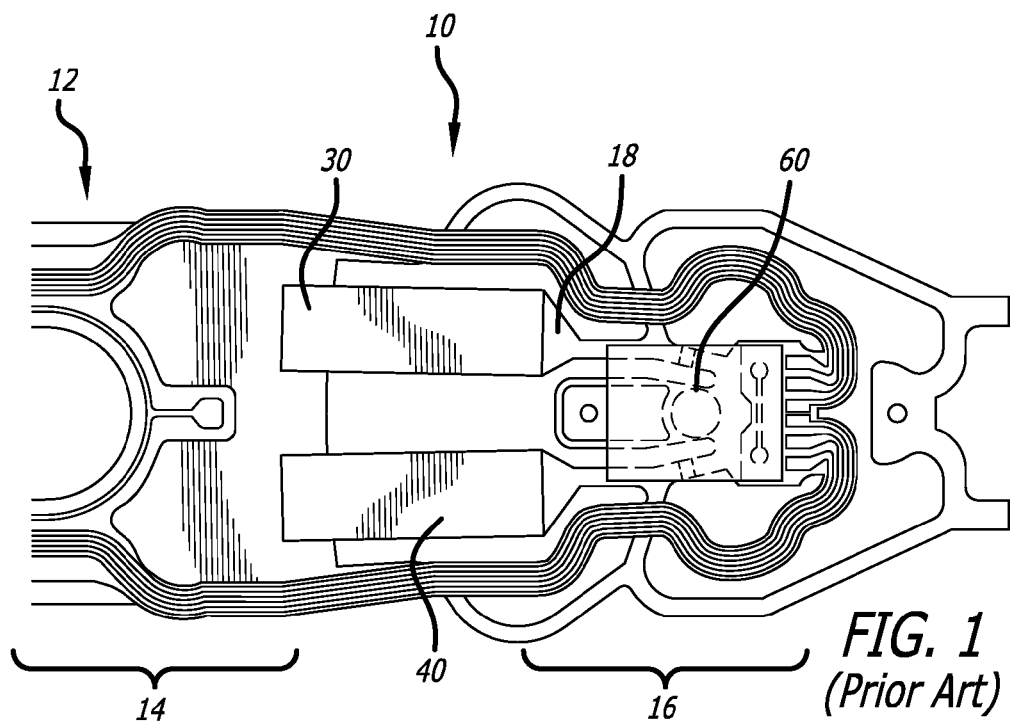
FIG. 1 is a bottom plan view of the flexure distal area near the PZTs of a GSA suspension according to the prior art.
Figure 2:
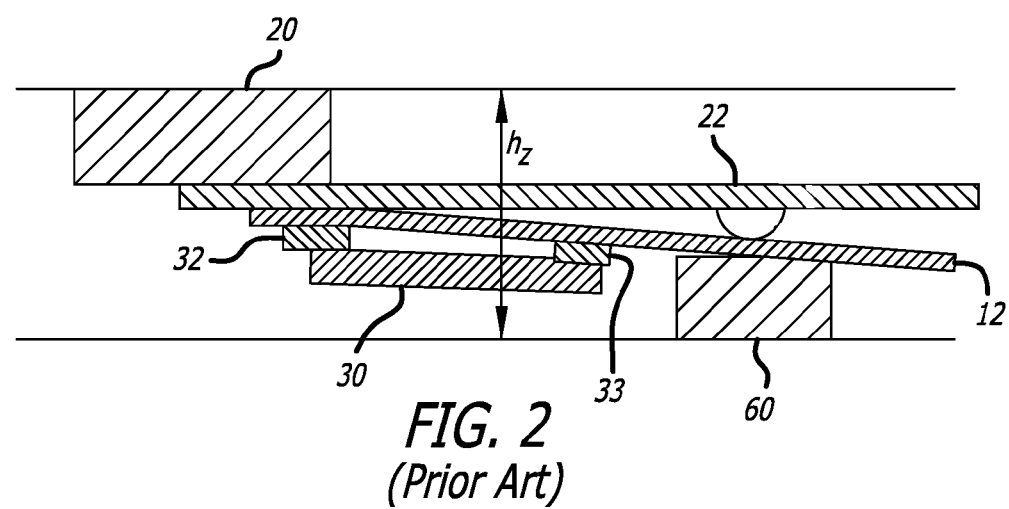
FIG. 2 is a stylized side sectional view of a suspension according to the prior art.

FIG. 5 is a partially exploded oblique view of a suspension flexure according to an exemplary embodiment of the invention. Flexure 110 is attached to load beam 22 by a usual method such as spot laser welding. Flexure 110 includes: a metal layer 12 which is stainless steel; an insulating layer of polyimide; and a copper layer out of which electrical circuit 50 is formed, the electrical circuit including both signal and voltage carrying traces. Electrical circuit 50 also includes copper pads 36, 46 through which the PZT driving voltages are applied to the positive electrodes of PZTs 30, 40. PZT 30 is adhered to copper pad 36 via conductive adhesive 32, and is adhered to stainless steel ground pad 38 via conductive adhesive 33. Similarly, PZT 40 is adhered to copper pad 46 via conductive adhesive 42, and is adhered to stainless steel ground pad 48 via conductive adhesive 43. The conductive adhesives may be epoxy, with the epoxy containing silver particles which provide the electrical conductivity. Stainless steel ground pads 38, 48 may be gold plated for corrosion resistance as disclosed in U.S. Pat. No. 9,025,285 to Lazatin et al.

The proximal ends of PZTs 30, 40 are relatively fixed by way of their being adhered to a relatively fixed part of the flexure, and their distal ends are relatively free to move up and down because flexible connectors 18 which are connected to gimbal 16 do not significantly constrain vertical movement of stainless steel ground pads 38, 48.

The PZT driving voltages for PZTs 30, 40 are supplied via signal traces within electrical circuit 50 to copper pads 36, 46, and through conductive adhesive 32, 42, respectively. The PZTs are grounded through conductive adhesive 33, 43 to pads 38, 48 of metal layer 12 of the flexure, which is grounded by its connection to load beam 22, which in turn is grounded through the actuator arm of the disk drive unit. The four dots of electrically conductive adhesive 32, 33, 42, 43 are the main points of structural adhesion between the PZTs and the flexure.

The stainless steel ground pads 38, 48 are connected through flexible stainless steel connectors 18 to gimbaled portion 16. In this way, PZTs 30, 40 extend from relatively fixed portion 14 of the flexure 110 to gimbaled portion 16, such that linear longitudinal expansion of one of the PZTs combined with linear longitudinal contraction of the other PZT together act in push-pull fashion to rotate the head slider 60. This rotation moves the read/write transducers within head slider 60 over the desired data track on the spinning disk platter below.

A number of variations are possible, and indeed are utilized within the disk drive industry, regarding exactly how the PZT driving voltages are connected to the drive electrodes of the PZTs 30, 40, and exactly how the ground connections are made. The arrangement shown is merely one example of many possibilities that are known within the field of DSA suspension design.

According to the exemplary embodiment of the invention, two spots, or dots 34, 44 of viscoelastic material (VEM) are dispensed in fluid form during assembly of the suspension, and the PZTs 30, 40 are then placed over dots 34, 44 such that the viscoelastic material is sandwiched between the PZTs and the gimbaled portion 60 of the suspension. The viscoelastic material 34, 44 is then allowed to cure such as by heat or by air drying, leaving the resulting viscoelastic dampers 34, 44 directly adhered to both the PZT and the flexure trace gimbal or more generally to a relatively fixed portion of the suspension. The viscoelastic dampers under the PZTs absorb vibrations and reduce the Z-height sensitivity of PZT FRF.

The viscoelastic material can be, for example, Quiet-Coat®, a sprayable polymer anti-sound and vibration damping coating available from PABCO Gypsum of Newark, Calif., www.pabcogypsum.com and www.quietrock.com, which has a drying time of approximately 20 minutes. The viscoelastic material could also be Axxon-NVN-274, a semi fluid paste noise and vibration dampening fluroscene polymer adhesive, available from Axxon Material Science of KP-80, Tansidco Industrial Estate, Kakalur-602003, Tamil Nadu, Indian, and which has a drying time of approximately 4-6 hours at 30-40° C.

The viscoelastic dampers 34, 44 are adhered to the PZTs 30, 40 as well as relatively fixed surfaces of flexure 110 such as that as the PZTs bend up and down vertically in cantilevered fashion, viscoelastic dampers 34 and 44 are stretched and compressed vertically thus absorbing energy. The viscoelastic dampers 34, 44 are also located on the PZTs at loci thereon at which the PZTs are adhered by adhesive 32/33 and 42/43 to the flexure. In the embodiment shown, the viscoelastic dampers are attached between adhesive 32, 42 and the distal ends of the PZTs, at loci that are within the proximal half of the PZTs. Dampers 34, 44 may cover only relatively small portions of PZTs 30, 40. In the exemplary embodiment, dampers 34, 44 cover less than one quarter of the surface of the PZTs to which they are attached.

In a GSA suspension the PZTs are generally mounted approximately 10-15 µm away from the trace gimbal surface. The average thickness of the resulting viscoelastic damper is therefore less than 20 µm, and is approximately 10-15 µm in the example.

Figure 6:
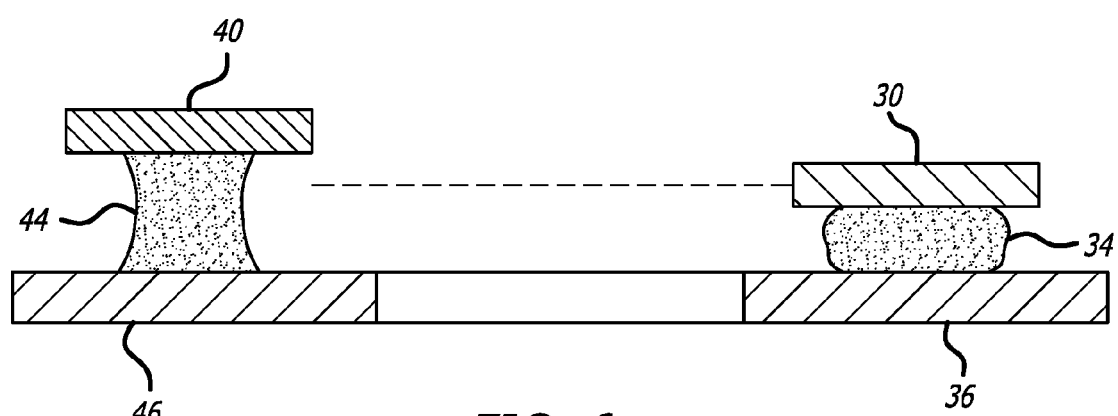
FIG. 6 is a cutaway side view of the flexure of FIG. 5 when the flexure is undergoing paddling mode vibration, showing the viscoelastic dampers in tension and compression.

FIG. 6 is a cutaway side view of the flexure of FIG. 5 when the flexure is undergoing paddling mode vibration, showing viscoelastic dampers 34, 44 that are sandwiched between the PZTs 30, 40 and the copper pads 36, 46 that are the adjacent surface of the flexure at that point, in compression and tension, respectively. Copper pads 36, 46 are in a relatively fixed portion of the suspension and thus act as anchor portions of the suspension, with the viscoelastic dampers 34, 44 attached to both the anchor portions and to the loci at which they are attached to the PZTs. The viscoelastic dampers 34, 44 are directly deformed under the PZT during vertical flexing of the PZTs including during paddling mode vibration. The dampers 34, 44 will absorb energy during both halves of the vibration cycle as the viscoelastic material is first stretched in one direction as the PZT flexes in that direction, illustrated as viscoelastic material 44 in FIG. 6, and then compressed in the opposite direction as the PZT flexes in that opposite direction, illustrated as viscoelastic material 34 in the figure. The PZT dampers 34, 44 will therefore attenuate the vibrations particularly in the paddling mode, making the FRF smoother, particularly at the important frequency of 9 KHz.

Figure 7:
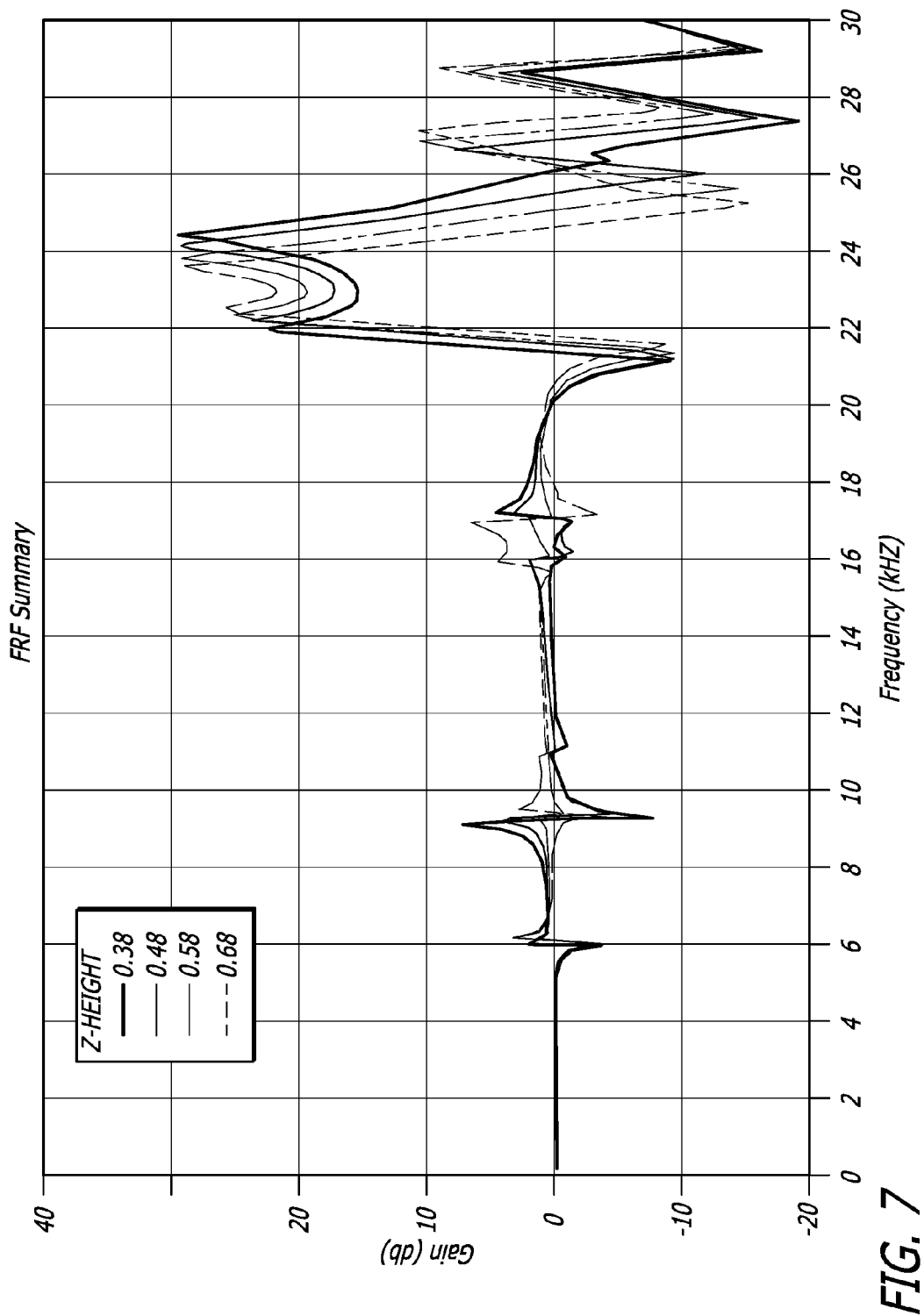
FIG. 7 is a PZT frequency response plot for the suspension of FIG. 5 for different z-heights, according to a simulation.
Figure 8:
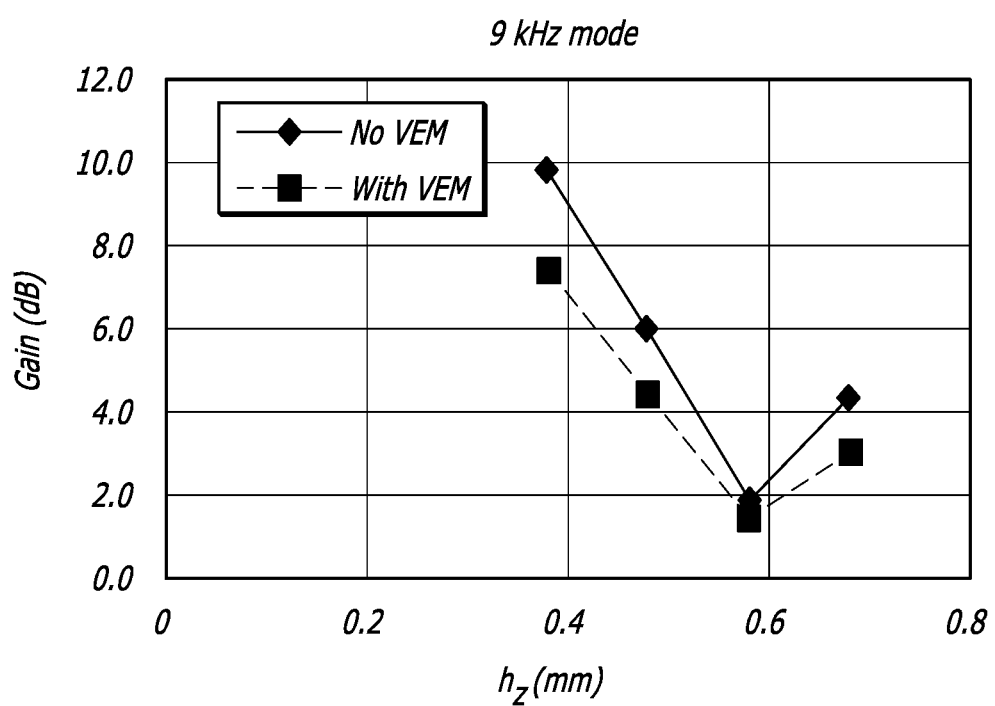
FIG. 8 is a graph of FRF vs. z-height at the 9 kHz frequency for the suspension of FIG. 5 for cases of a suspension with and without a PZT damper, according to a simulation.

FIGS. 7 and 8 present the modeling results of PZT FRF for different z-height variations.

Figure 3:
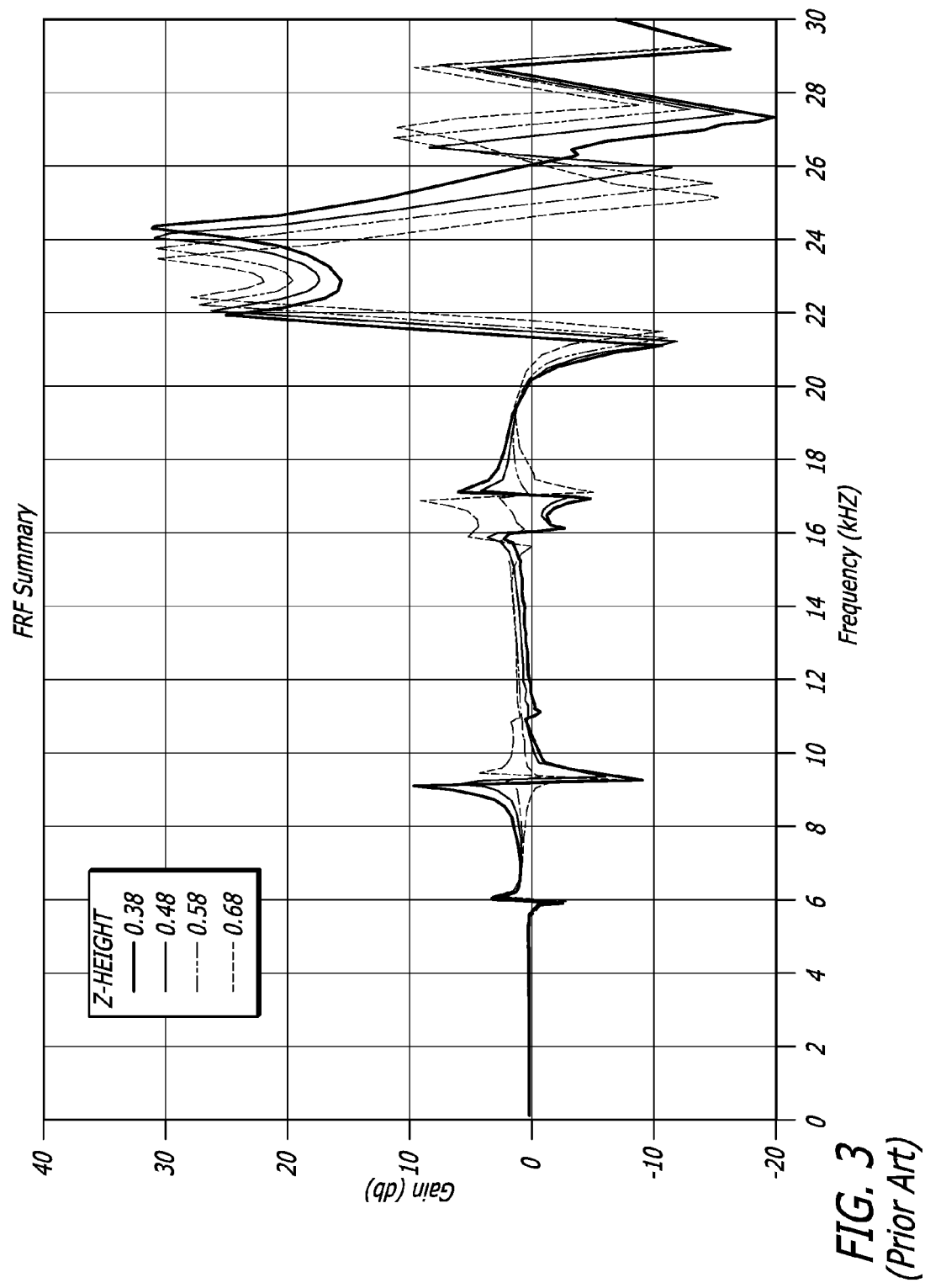
FIG. 3 is a PZT frequency response plot of a prior art GSA suspension for different z-heights, according to a simulation.

FIG. 7 is a PZT frequency response plot for the suspension of FIG. 5, for different z-heights according to a simulation. Comparing the plots presented in FIG. 7 to the plots in FIG. 3, one can see that the addition of the PZT damper has reduced the various FRF peaks by approximately 2-3 dB, and particularly has reduced the highest peak at the frequency of approximately 9 kHz by approximately 3 dB.

The addition of the PZT damper according to the invention has thus achieved the improvement of reducing the FRF peaks and thus making for more uniform PZT frequency response.

FIG. 8 is a graph of FRF vs. z-height at the 9 kHz frequency for the suspension of FIG. 5, for cases of a suspension with a PZT damper according to the invention, and without a PZT damper, according to a simulation. For a z-height of 0.38 mm, the damper reduced the gain by approximately 2.4 dB. For a z-height of 0.48 mm, the damper reduced the gain by approximately 1.8 dB. For a z-height of 0.58 mm, the damper reduced the gain by approximately 0.4 dB. For a z-height of 0.68 mm, the damper reduced the gain by approximately 1.2 dB.

The PZT dampers also help to attenuate vibrations and thus reduce the FRF at the 16 kHz and 17 kHz frequencies as well, although the improvement is less pronounced than at the 9 kHz frequency.

The viscoelastic damper could, at least in theory, alternatively come in sheet form with a layer of adhesive covered by a protective, peel-away liner, such as is commonly used for load beam dampers within suspensions. For discussion purposes, such dampers will be referred to herein as "stick-on dampers." Such stick-on dampers would not require a dispense step, requiring instead a peel-and-stick step followed by curing.

Stick-on dampers, however, would have several drawbacks. First, the adhesive on such dampers is usually provided on only one side, so the dampers would not adhere to both the PZT and the trace gimbal without additional steps. A dampening material with adhesive and a peel-off liner on both sides would be difficult to handle due to the second peel-off step and the small size of the damper.

Second, most commercially supplied stick-on dampers are too thick, having fixed thicknesses of 25 µm or 50 µm, whereas PZTs of a GSA suspension are generally only 10-15 µm away from the trace gimbal surface. A stick-on damper on the side of the PZT opposite the trace gimbal would be constrained on only one side, and would reduce the effective distance between the PZT and the disk platter, thus reducing shock susceptibility.

Figure 9:
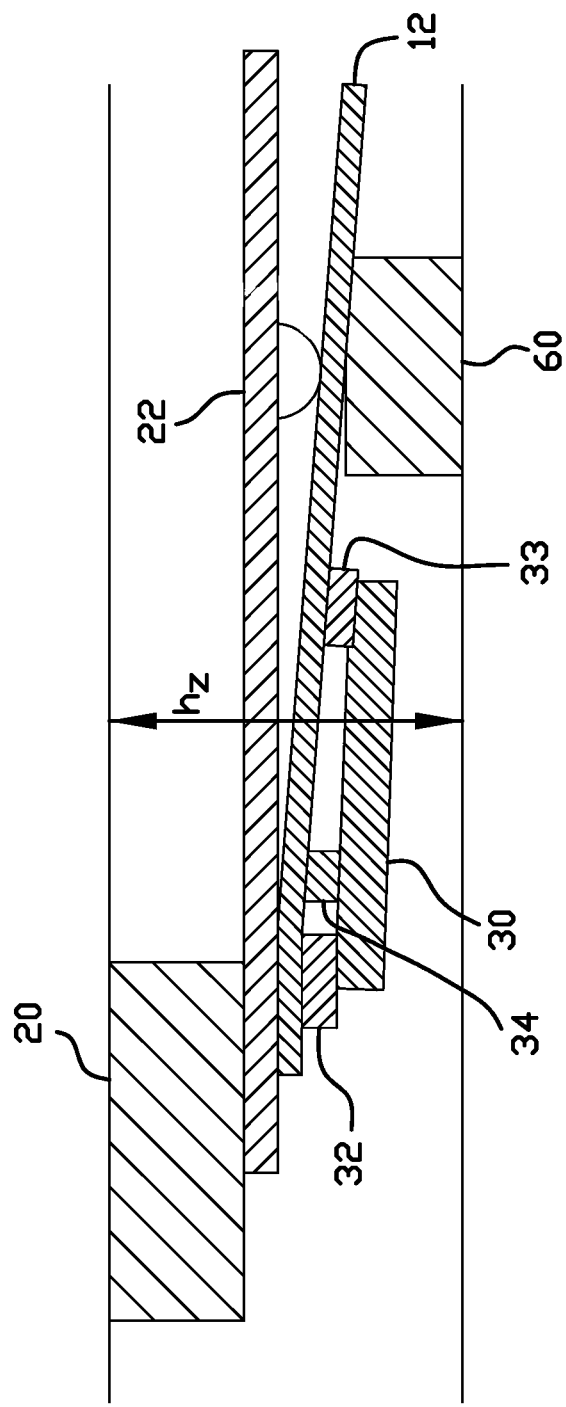
FIG. 9 is a cutaway side view of a flexure including viscoeleastic dampers including a non-uniform thickness according to an embodiment.

Finally, the PZT is usually slightly sloped with respect to the trace gimbal surface, so a stick-on damper having uniform thickness would not adhere as well to both surfaces as would a damper dispensed in paste form and then hardened in situ. For a suspension in which the PZTs are sloped with respect to the gimbal surface, when the viscoelastic material is applied in fluid form and the PZTs are placed over the viscoelastic material which is then cured, the resulting viscoelastic dampers will have a non-uniform thickness and will be sloped, with the non-uniform thickness of the dampers conforming to the slope of the PZTs relative to the adjacent surface of the flexure below the PZTs such as illustrated in FIG. 9. For example, the viscoelastic material may have a thickness difference of at least 5% or at least 10% over its area, with the thickness increasing from one side of the viscoelastic material to the opposite side. Using dampers that are dispensed in fluid form and thereafter hardened in place therefore helps to ensure that the dampers are firmly attached on both sides across their entire surface areas.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

We claim:

1. A dual stage actuated (DSA) suspension for a disk drive, the suspension comprising:
    a beam portion;
    a flexure affixed to the beam portion, the flexure carrying a read/write head for writing data to, and reading data from, a rotating data disk;
    a piezoelectric microactuator located on the suspension for effecting fine movements of the read/write head; and
    a viscoelastic damper adhered to the piezoelectric microactuator, wherein the viscoelastic damper has a non-uniform thickness.

2. The DSA suspension of claim 1 wherein the viscoelastic damper is sandwiched between the piezoelectric microactuator and a surface of the suspension, the damper thus absorbing energy both when the microactuator flexes away from the suspension surface and when the microactuator flexes toward the suspension surface.

3. The DSA suspension of claim 1 wherein the piezoelectric microactuator is relatively fixed at a proximal end thereof by a first adhesive, and relatively free to move at a distal end thereof opposite the proximal end, and the viscoelastic damper is adhered to a surface of the suspension between the first adhesive and the distal end of the suspension.

4. The DSA suspension of claim 1 wherein:
    the viscoelastic damper is adhered to a first surface of the piezoelectric microactuator; and
    the viscoelastic damper covers less than one quarter of said first surface of the piezoelectric microactuator.

5. The DSA suspension of claim 1 wherein the viscoelastic damper was dispensed in fluid form onto the suspension and thereafter cured.

6. The DSA suspension of claim 2 wherein the viscoelastic damper has an average thickness of less than 20 µm.

7. A dual stage actuated (DSA) suspension for a disk drive, the suspension comprising:
    a beam portion;
    a flexure affixed to the beam portion, the flexure including a gimbal;
    a read/write head mounted to the gimbal;
    a microactuator mounted to a first side of the flexure and coupled to the gimbal for moving the read/write head; and
    a viscoelastic damper disposed between the microactuator and the first side of the flexure, the viscoelastic damper being adhered directly to both the microactuator and the first side of the flexure, wherein the viscoelastic damper has a non-uniform thickness.

8. The DSA suspension of claim 7 wherein the viscoelastic damper was dispensed in fluid form, was brought into direct contact with both the microactuator and the first side of the flexure, and was thereafter hardened to adhere it to both the microactuator and the first side of the flexure.

9. The DSA suspension of claim 7 wherein the viscoelastic damper is disposed between loci on the microactuator at which the microactuator is adhered by epoxy to the flexure.

10. The DSA suspension of claim 7 wherein the viscoelastic damper has an average thickness of less than 20 µm.

11. The DSA suspension of claim 7 wherein the viscoelastic damper has a thickness that varies by at least 5%.

12. The DSA suspension of claim 7 wherein the non-uniform thickness of the viscoelastic damper conforms to a slope of the microactuator relative to an adjacent surface of the flexure.

13. The DSA suspension of claim 7 wherein:
    the viscoelastic damper is adhered to a first surface of the microactuator; and
    the viscoelastic damper covers less than one quarter of said first surface of the microactuator.

14. A dual stage actuator (DSA) type suspension for a disk drive, the suspension comprising:
    a load beam;
    a gimbaled portion including a head slider, the gimbaled portion being attached in gimbaled fashion to the load beam so that the head slider pitches and rolls freely in response to surface irregularities in a surface of a data disk as the data disk travels underneath the head slider;
    a microactuator having a first end and a second end opposite the first end, the microactuator being attached at its first end to a non-gimbaled portion of the suspension and being attached at its second end to the gimbaled portion such that when the microactuator contracts in a longitudinal direction, it pulls on the gimbaled portion to effect fine movements of the head slider; and
    a viscoelastic material adhered to the microactuator at a locus thereof and to an anchor portion of the suspension and extending between the microactuator locus and the anchor portion such that as the microactuator locus moves in a vertical direction relative to said anchor portion the viscoelastic material is stretched or compressed thereby absorbing energy, wherein the viscoelastic material has a non-uniform thickness.

15. The DSA suspension of claim 14 wherein said microactuator locus is located in a proximal half of the microactuator.

16. The DSA suspension of claim 14 wherein said viscoelastic material attenuates vertical flexing vibrations.

17. The DSA suspension of claim 14 wherein said viscoelastic material attenuates paddling vibrations at the microactuator.

18. The DSA suspension of claim 14 wherein:
    the viscoelastic material is adhered to a first face of the microactuator; and
    the viscoelastic materials covers less than one quarter of said first face of the microactuator.

* * * * *